(12) United States Patent
Sato et al.

(10) Patent No.: US 6,462,969 B1
(45) Date of Patent: Oct. 8, 2002

(54) METHOD AND APPARATUS FOR CONTROLLING POWER SUPPLY UNITS IN A POWER SUPPLY BASED ON THE NUMBER OF OPERATING POWER SUPPLY UNITS

(75) Inventors: Osamu Sato; Hiroaki Inoue, both of Tochigi (JP)

(73) Assignee: The Furukawa Battery Co., Ltd., Yokohama (JP)

( * ) Notice: Subject to any disclaimer, the term of this patent is extended or adjusted under 35 U.S.C. 154(b) by 0 days.

(21) Appl. No.: 09/984,273

(22) Filed: Oct. 29, 2001

(30) Foreign Application Priority Data

Oct. 30, 2000 (JP) .......................... 2000-329989

(51) Int. Cl.[7] ................................... H02H 9/08
(52) U.S. Cl. ........................... 363/69; 361/93.9
(58) Field of Search ................. 363/69, 52, 125; 361/93.1, 93.9, 115

(56) References Cited

U.S. PATENT DOCUMENTS 3,746,967 A * 7/1973 Koltuniak et al. ............. 363/70
4,451,773 A * 5/1984 Papathomas et al. .......... 307/48
5,864,476 A * 1/1999 Busch ......................... 307/109

* cited by examiner

Primary Examiner—Shawn Riley
(74) Attorney, Agent, or Firm—McGinn & Gibb, PLLC

(57) ABSTRACT

In a power supply system connected to a load, a plurality of DC power source units are connected in parallel. Each DC power source unit is provided with a unit rated current value $I_u$, and outputs a unit current in accordance with a target value. A required load capacity provider provides a capacity value $I_s$ required in the load. An operating condition detector detects the number m of DC power supply unit which is in an operating condition among the DC power source units. A target value calculator calculates a value obtained by dividing the value $I_s$ with the value m, and provides the calculated value $I_s/m$ to the respective operating DC power supply unit as the target value.

5 Claims, 2 Drawing Sheets

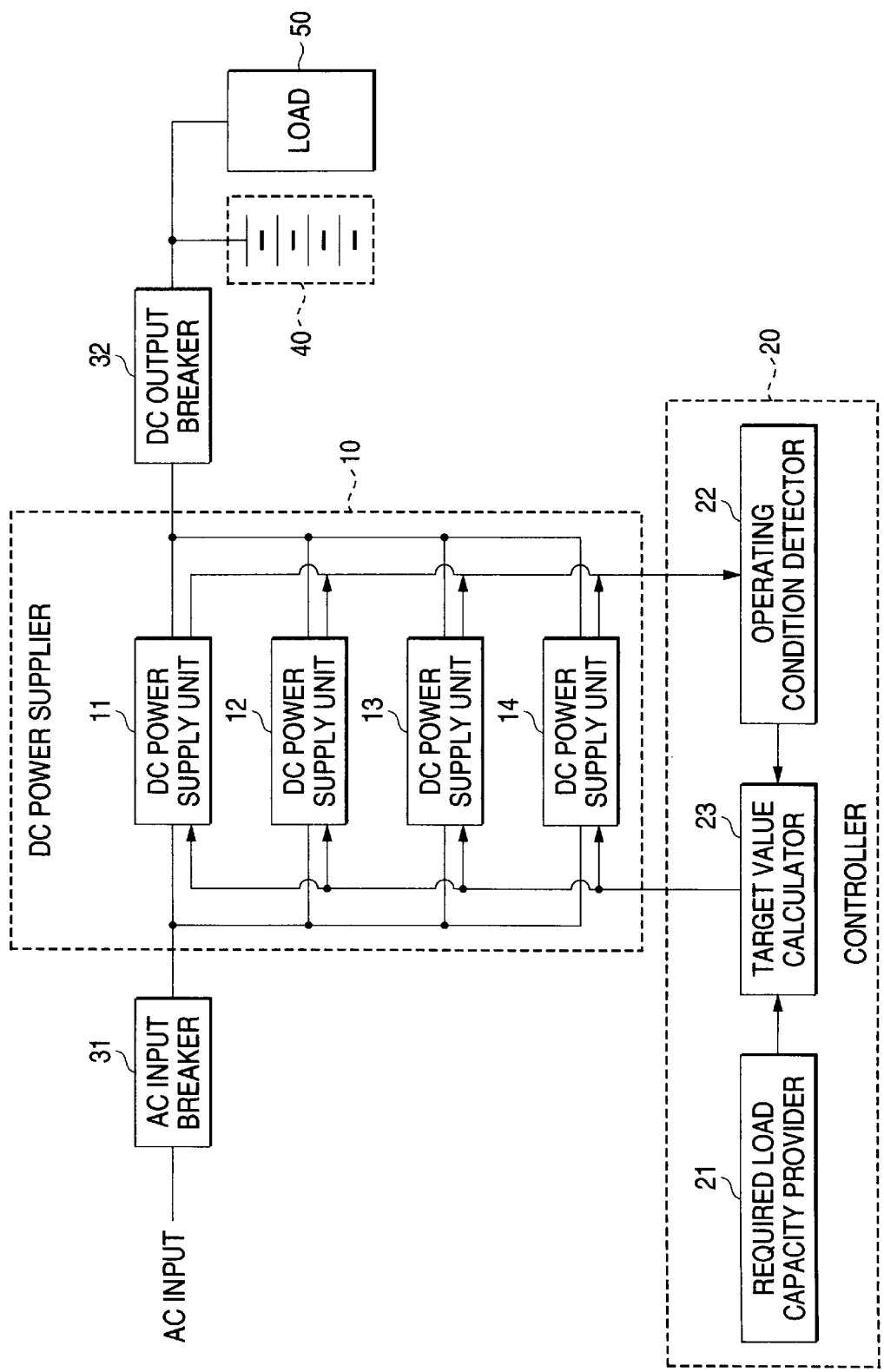

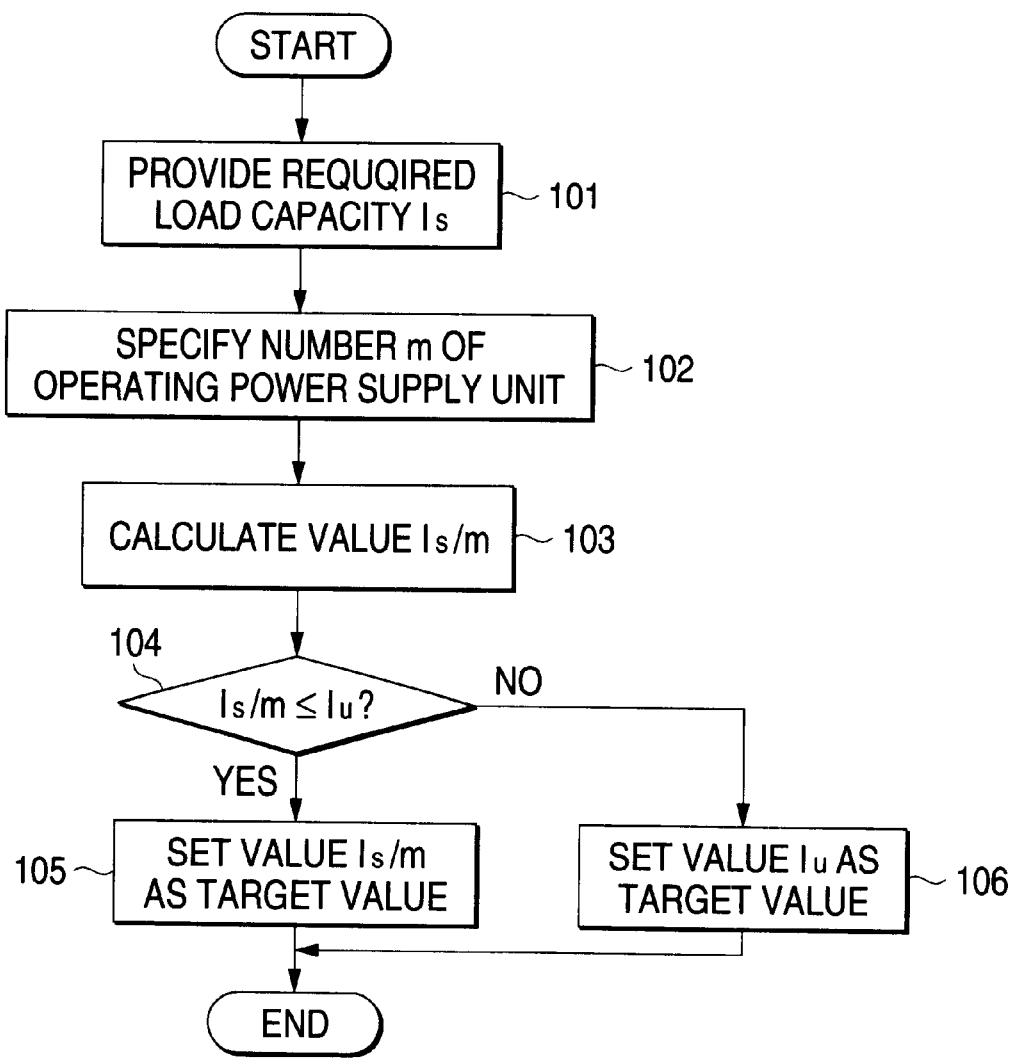

METHOD AND APPARATUS FOR CONTROLLING POWER SUPPLY UNITS IN A POWER SUPPLY BASED ON THE NUMBER OF OPERATING POWER SUPPLY UNITS

BACKGROUND OF THE INVENTION

The present invention relates to a power supply system composed of a DC power supplier in which a plurality of DC power supply units provided with a unit rated current value $I_u$ are connected in parallel, capable of adjusting an unit current of each power supply unit in accordance with a target value, and a controller for providing the target value to the DC power supply units.

There has been known that an electric power is fed to a load of required load capacity $I_s$ with a power supply system composed of a DC power supplier in which a plurality of DC power supply units provided with a unit rated current value $I_u$ are connected in parallel, and a controller for controlling the number of operating units. With this related power supply system, an electric current $m \cdot I_u$ given by the product between the number m of operating units selected by the operating unit number controller and the unit rated current value $I_u$ is supplied to the load as a load current.

In the related power supply system as described above, for example, four DC power supply units are connected in parallel to supply the load current $4I_u$ to the load of required load capacity $I_s$. If one DC power supply unit is stopped, remaining three DC power supply units are employed for feeding electric power, in which the electric current of $3I_u$ is supplied to the load. Namely, the electric current to be supplied is greatly decreased to three-fourth. With two DC power supply units, the electric current drops to $2I_u$ or half of the normal condition, and it is almost impossible to operate the load of required load capacity $I_s$. In this way, the related power supply system in which the operating unit number is controlled can only adjust the feeding current to the load at every step of the unit rated current value of the DC power supply unit, resulting in a problem that the electric power conformable to the required load capacity can not be fed.

Providing more DC power supply units making up the DC power supplier, it is possible to prevent the feeding current from greatly decreasing, when the DC power supply unit during operation is stopped. Also, the required load capacity $I_s$ can be easily changed. However, if the number of DC power supply units is increased, there is a problem that the costs of the DC power supply system rise correspondingly. Briefly, there was a problem with the related power supply system that various required load capacities $I_s$ can not be dealt with. Further, there was the need for preparing the capacity according to the capacity of the entire power supply system for the AC input breaker, irrespective of the load capacity.

Further, when the commercial power supply fails, an engine generator may be utilized. In this case, when the power supply system is activated by the engine generator, an excessive electric current exceeding an output capacity of the engine generator may flow, bringing about the danger that the engine generator may knock to make the output power state worse, and in the worst case, to stop the engine generator.

To prevent this false state, the engine generator having a capacity greater than the required load power and capable of outputting an excessive current flowing into the power supply system is prepared, or the number of power supply units is limited to the number of units capable of supplying the minimum load current.

However, if the capacity of the engine generator was increased, the installation cost becomes higher, or if the number of units is limited, the minimum load current might not be supplied when the power supply unit is stopped during the operation, due to some reason, resulting in a problem that the reliability is lowered.

SUMMARY OF THE INVENTION

It is an object of the invention to provide a power supply system in which a load current conformable to a required load capacity can be supplied.

In order to achieve the above object, according to the present invention, there is provided a power supply system which includes a DC power supplier, a required load capacity provider, an operating condition detector and a target value calculator. The DC power supplier includes a plurality of DC power supply units connected in parallel each having a unit rated current value $I_u$ and outputting a unit current in accordance with a target value. The required load capacity provider provides a capacity value $I_s$ which is required in the attached load. The operating condition detector detects the number, m, of DC power supply units which are operating. The target value calculator calculates a target value by dividing the capacity value $I_s$ with the number, m, of operating DC power supply units and provides the calculated target value $I_s/m$ to each operating DC power supply unit.

Preferably, the target value calculator provides the unit rated current value $I_u$ when the calculated value $I_s/m$ exceeds the unit rated current value $I_u$.

In the above configurations, an electric current conformable to the required load capacity can be supplied to the load.

Preferably, the power supply system further includes an AC input breaker connected to an input side of the DC power supplier in parallel with the respective DC power source units. Here, a capacity of the AC input breaker is equivalent to the capacity value $I_s$.

In this configuration, an AC input breaker having a smaller capacity than employed for the related power supply system can be used, whereby the costs of the power supply system can be lowered correspondingly.

Further, there is no need of limiting the number of power source units even when an engine generator is employed, whereby the power supply system can always operate in prepared number of units. Therefore, it is not required to increase the capacity of the engine generator while being in highly reliable state, whereby the installation costs can be suppressed.

According to the present invention, there is also provided a method of controlling an electric power supplied from a power supply system to a load. The method including providing a capacity value $I_s$ which is required in the load; detecting the number, m, of operating DC power supply units in the power supply system; calculating a target value by dividing the value $I_s$ with the value m; and providing the calculated target value $I_s/m$ to each DC power supply unit. The method also includes adjusting the current from each DC power supply unit to coincide with the calculated target value.

It is also preferable that the control method further includes determining whether the calculated target value $I_s/m$ exceeds a unit rated current value $I_u$ of each DC power supply unit and providing the unit rated current value $I_u$ as the target value when the calculated value $I_s/m$ exceeds the unit rated current value $I_u$.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein:

FIG. 1 is a block diagram showing the configuration of a power supply system according to one embodiment of the present invention; and FIG. 2 is a flowchart showing one example of operation flow of the power supply system.

DETAILED DESCRIPTION OF THE PREFERRED EMBODIMENTS

A power supply system according to one embodiment of the present invention is composed of a DC power supplier 10 and a controller 20, as shown in a block diagram of FIG. 1. An AC input breaker 31 is provided at the input side of the DC power supplier 10, and a DC output breaker 32 is provided at the output side. The present power supply system supplies a required electric power to a load 50 via the DC output breaker 32. Note that a battery 40 as an auxiliary power source is provided at the output side of the DC output breaker 32.

The DC power supplier 10 has a plurality of DC power supply units 11, 12, 13 and 14 connected in parallel. Each of the DC power supply units 11, 12, 13 and 14 is provided with a unit rated current value $I_u$. The DC power supplier 10 is capable of adjusting a unit current flowing in each DC power supply unit, in accordance with a target value.

The controller 20 is composed of required a load capacity provider 21, an operating condition detector 22 and a target value calculator 23. The required load capacity provider 21 provides a required load capacity $I_s$ for the present power supply system to the target value calculator 23. The operating condition detector 22 detects the operating condition of the plurality of DC power supply units 11, 12, 13 and 14 to specify the number m of operable units and input the same to the target value calculator 23. The target value calculator 23 performs a predetermined calculation as set forth below to provide the calculated result to the plurality of DC power supply units 11, 12, 13 and 14 as the target value. The controller 20 comprises a CPU for executing various arithmetical operations and control operations, a ROM storing control programs, and a RAM storing various kinds of data.

The power supply system as configured the above is operated in accordance with a flowchart of FIG. 2. That is, the target value calculator 23 has a required load capacity 1 of the load 50 provided by the required load capacity provider 21 (step 101). A system operator operates the required load capacity provider 21 to perform the setting of the required load capacity $I_s$. On the other hand, the operating condition detector 22 always monitors the plurality of DC power supply units 11, 12, 13 and 14 to specify the DC power supply units in the operating condition (the number m of operating units) and input the value m to the target value calculator 23 (step 102).

The target value calculator 23 calculates a value $I_s/m$ in which the required load capacity is divided by the number of operating DC power supply units (step 103). Then it determines whether the value $I_s/m$ of the calculated result is the unit rated current value $I_u$ or less (step 104). If the answer is YES, the value $I_s/m$ is provided to the DC power supply units in the operating condition as the target value (step 105). If the answer is NO, the unit rated current value $I_u$ is provided to the DC power supply units in the operating condition as the target value (step 106).

For example, in a case where the unit rated current value $I_u$ is 100 A, the required load capacity $I_s$ of the load 50 is 270 A, and four DC power supply units 11, 12, 13 and 14 are all in the operating condition, the target value is equal to 270 A/4=67.5 A. In accordance with this target value, each DC power supply unit supplies a unit current 67.5 A, and consequently four DC power supply units supply 270 A or a load current amounting to the required load capacity. If one of the four DC power supply units is stopped, the target value amounts to 270 A/3=90 A. Then, each DC power supply unit supplies a unit current 90 A in accordance with this target value, and consequently three DC supply units supply 270 A or a load current amounting to the required load capacity. In this way, the case where four or three DC power supply units are employed to supply an electric power to the load 50 with a required load capacity $I_s$ of 270 A, the load current to be supplied is conformable to the required load capacity. In other words, with this invention, the power supply state optimized as the power supply system can be kept continuously.

If two DC power supply units are stopped, the value $I_s/m$ is 135 A, which exceeds the unit rated current value 100 A. In this case, the controller 20 supplies 100 A equal to the unit rated current value as the target value to two DC power supply units in the operating condition. Then, in accordance with this target value, each DC power supply unit supplies the unit current 100 A, and consequently two DC power supply units can supply 200 A to the load 50. This amount is only 75% or more of the required load capacity 270 A, but is large enough to supply a power in a short time until recovery.

By the way, the related power supply system in which the number of operating power supply unit is controlled is required to prepare for the AC input capacity amounting to the product of the number m of operating DC power supply unit and the unit rated current value $I_u$, and accordingly there is the need for an AC input breaker with the capacity corresponding to this AC input capacity. For example, in a case where m is 4, and $I_u$ is 100 A, it is necessary to prepare for the AC input capacity of 400 A. On the contrary, in this embodiment, it is only necessary to prepare for the AC input capacity amounting to the product of the number m of operating DC power supply unit and the unit current value. This unit current is the target value provided from the controller 20 to the DC power supply unit, that is, $I_s/m$. In the above example where $I_s$ is 270 A and m is 4, the unit current is equal to 67.5 A. Accordingly, in this invention, there is the need of preparing for 270 A that is a quadruple of 67.5 A, namely, the AC input breaker with the capacity corresponding to the required load capacity $I_s$. This is a quite smaller capacity than the related AC input capacity corresponding to 400 A. Therefore, it is possible to employ the AC input breaker having a smaller capacity than the related system.

Further, since the load current is made correspond to the required load capacity, an excessive current is hardly to flow in the case where an engine generator is employed to activate the power supply system under power failure, for example. Thus, there is no need of limiting the number of operating unit as in the related system.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A power supply system connected to a load, comprising:

a DC power supplier, in which a plurality of DC power supply units are connected in parallel, each DC power supply unit provided with a unit rated current value $I_u$, and outputting a unit current in accordance with a target value;

a required load capacity provider, which provides a capacity value $I_s$ required in the load;

an operating condition detector, which detects the number m of DC power supply units which are operating; and a target value calculator, which calculates a target value obtained by dividing the value $I_s$ with the value m and provides the calculated target value $I_s/m$ to the respective operating DC power supply units.

2. The power supply system as set forth in claim 1, further comprising an AC input breaker connected to an input side of the DC power supplier in parallel with the respective DC power source units, wherein a capacity of the AC input breaker is equivalent to the capacity value $I_s$.

3. The power supply system as set forth in claim 1, wherein the target value calculator provides the unit rated current value $I_u$ when the calculated value $I_s/m$ exceeds the unit rated current value $I_u$.

4. A method of controlling an electric power supplied from a power supply system to a load, comprising:

providing a capacity value $I_s$ required in the load;

detecting the number m of DC power supply units which are operating;

calculating a target value obtained by dividing the value $I_s$ with the value m;

providing the calculated target value $I_s/m$ to the respective operating DC power supply units; and adjusting a unit current outputted form each operating DC power supply unit so as to be coincident with the target value.

5. The control method as set forth in claim 4, further comprising:

determining whether the calculated value $I_s/m$ exceeds a unit rated current value of each DC power supply unit; and providing the value $I_u$ as the target value when the calculated value $I_s/m$ exceeds the unit rated current value $I_u$.

* * * * *